(12) United States Patent
Geisler

(10) Patent No.: US 10,532,750 B2
(45) Date of Patent: Jan. 14, 2020

(54) METHOD, DEVICE AND SYSTEM FOR WRONG-WAY DRIVER DETECTION

(71) Applicant: Robert Bosch Gmbh, Stuttgart (DE)

(72) Inventor: Simon Geisler, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/301,032

(22) PCT Filed: Apr. 13, 2017

(86) PCT No.: PCT/EP2017/059006
§ 371 (c)(1),
(2) Date: Nov. 13, 2018

(87) PCT Pub. No.: WO2017/211490
PCT Pub. Date: Dec. 14, 2017

(65) Prior Publication Data
US 2019/0176848 A1    Jun. 13, 2019

(30) Foreign Application Priority Data

Jun. 7, 2016    (DE) ........................ 10 2016 210 029

(51) Int. Cl.
*B60W 50/14*    (2012.01)
*G06F 16/29*    (2019.01)
*G01C 21/30*    (2006.01)

(52) U.S. Cl.
CPC ............. *B60W 50/14* (2013.01); *G01C 21/30* (2013.01); *G06F 16/29* (2019.01);
(Continued)

(58) Field of Classification Search
CPC .... B60W 50/14; B60W 2520/06; G06F 16/29
(Continued)

(56) References Cited

U.S. PATENT DOCUMENTS

2012/0290150 A1    11/2012    Doughty et al.
2013/0304374 A1    11/2013    Lee et al.
(Continued)

FOREIGN PATENT DOCUMENTS

DE    102011120497 A1    6/2012
DE    102012208974 A1    12/2012

OTHER PUBLICATIONS

International Search Report for PCT/EP2017/059006, dated Aug. 10, 2017.
(Continued)

*Primary Examiner* — John A Tweel, Jr.
(74) *Attorney, Agent, or Firm* — Norton Rose Fulbright US LLP; Gerard Messina

(57) ABSTRACT

A method for wrong-way driver detection. The method includes a step of reading in position data via an interface, the position data representing a measured position of a vehicle, a step of reading in map data, which map a set of road elements of a road network negotiable by the vehicle, a step of determining a plurality of particles using the map data, one particle representing an assumed position of the vehicle and a weighting assigned to the assumed position, and a step of determining at least one road element from the set of road elements which is plausible with respect to a negotiation by the vehicle based on the plurality of particles, using a particle filter.

19 Claims, 7 Drawing Sheets

(52) U.S. Cl.
CPC ... *B60W 2050/143* (2013.01); *B60W 2520/06* (2013.01); *B60W 2550/22* (2013.01)

(58) Field of Classification Search
USPC ..................................................... 340/425.5
See application file for complete search history.

(56) References Cited

U.S. PATENT DOCUMENTS

| | | | | |
|---|---|---|---|---|
| 2019/0139404 A1* | 5/2019 | Geisler | .................. | G08G 1/166 |
| 2019/0145783 A1* | 5/2019 | Geisler | .................. | G01C 21/30 |

OTHER PUBLICATIONS

Tao Junli et al., "Wrong Roadway Detection for Multi-lane Roads", Aug. 27, 2013, Network and Parallel Computing; Lecture Notes in Computer Science; Springer International Publishing, pp. 50-58, XP047038828.

F. Peyet et al., "Lane-level positioning for cooperative systems using EGNOS and enhanced digital maps", Mar. 31, 2008, XP055393844.

Schindler Andreas, "Vehicle self-localization with high-precision digital maps", 2013 IEEE Intelligent Vehicles Symposium ( I V ) , I EEE , Jun. 23, 2013, pp. 141-146, XP032502004.

\* cited by examiner

METHOD, DEVICE AND SYSTEM FOR WRONG-WAY DRIVER DETECTION

BACKGROUND INFORMATION

The present invention is directed to a device and a method for wrong-way driver detection. The present invention also relates to a computer program.

Wrong-way drivers ("ghost drivers") cause at least considerable property damage in the event of an accident. The detection based only on the navigation device (road class and direction) is too late in most instances, i.e., the wrong-way driver is already traveling (at a high driving speed and with a high probability of a collision) on the wrong lane.

SUMMARY

The present invention provides a method, a device and a system for wrong-way driver detection, and finally a corresponding computer program. The measures described herein allow advantageous refinements of and improvements on the device according to the present invention.

A, for example, cloud-based wrong-way driver warning may advantageously be implemented with a detection which is adapted specifically to the case, using a particle filter.

A method for wrong-way driver detection includes the following steps:
reading in position data via an interface, the position data representing a measured position of a vehicle;
reading in map data, which map a set of road elements of the road network negotiable by a vehicle;
determining a plurality of particles using the position data, one particle representing an assumed position of the vehicle and a weighting assigned to the assumed position; and
determining at least one road element, which is plausible with respect to a negotiation by the vehicle, from the set of road elements based on the plurality of particles, using a particle filter.

The vehicle may be a road vehicle. Wrong-way driving may be understood to mean a drive of the vehicle on a road counter to a prescribed driving direction. The measured position may have been measured using a sensor situated in the vehicle. The plurality of particles may be determined using a method using known particle filters. The particles may have different assumed positions which, for example, are grouped around the measured position. A plausible road segment may be understood to mean a road segment for which it is assumed, after evaluation of the present data, that the vehicle is situated thereon. The plausible road segment may be used instead of the measured position for detecting a wrong-way drive of the vehicle.

The method may thus include a step of determining a wrong-way driving signal, using the plausible road segment. The wrong-way driving signal may indicate whether or not the vehicle is driving the wrong way. For example, the wrong-way driving signal may only be provided when a wrong-way drive is assumed.

In the step of determining the plausible road element, road elements, from the set of road elements which extend at a small distance from one another, may be excluded from the determination of the at least one plausible road element. In this way, road elements which empirically result in errors may be excluded.

In the step of determining the plausible road element, road elements from the set of road elements which extend at a small distance from one another may also be used as one combined road element in the determination of the at least one plausible road element. Such a combined road element may be determined as a road element negotiable in both driving directions. In this way, it is possible to determine a plausible road element even when it is not possible to reliably determine on which of the road elements that extend at a small distance from one another a vehicle is situated. Furthermore, an erroneous provision of a wrong-way driving signal may be avoided since no directional information is assigned to the combined road element.

The method may include a step of selecting the road elements from the set of road elements which extend at a small distance from one another. It is possible to select such road elements which are situated in a junction area of a further road. In this way, it is possible to exclude junction areas in the wrong-way driver detection since reliable detection of a wrong-way driver is difficult here. Such a junction area extends, for example, proceeding from the further road, for example a rural road, over the first few meters of an exit ramp or an on-ramp to a thruway, such as an expressway.

In addition or as an alternative, it is possible to select such road elements which extend next to one another separated by less than 10 meters. At such a small distance, it is also difficult to reliably decide on which of the two road elements a vehicle is situated.

In the step of reading in, the position data may be read in via an interface of a so-called processor cloud. This enables a cloud-based solution.

A corresponding device for wrong-way driver detection is configured to carry out steps of the described method in corresponding units. For example, such a device may include a read-in unit, which is designed to read in position data via an interface, a further read-in unit, which is designed to read in map data mapping a set of road elements of a road network negotiable by the vehicle, a determination unit, which is designed to determine a plurality of particles using the position data, and a determination unit, which is designed to determine at least one road element from the set of road elements which is plausible with respect to a negotiation by the vehicle based on the plurality of particles, using a particle filter. Accordingly, the device may include the particle filter.

A corresponding system for wrong-way driver detection includes at least one transmitter, which is situatable or situated in a vehicle and designed to emit position data, and a described device for wrong-way driver detection, which is designed to receive the position data emitted by the at least one transmitter, for example via a wireless connection.

A further system for wrong-way driver detection includes at least one transmitter, which is situatable or situated in a vehicle and designed to emit position data, the position data representing a measured position of a vehicle, and at least one receiver unit, which is situatable or situated in a vehicle and designed to receive data of a device, which according to the approach described here for wrong-way driver detection is designed to receive the position data emitted by the at least one transmitter.

The described method may be implemented in software or hardware or in a mixed form made up of software and hardware, for example in a device.

For this purpose, the device may include at least one processing unit for processing signals or data, at least one memory unit for storing signals or data and/or at least one communication interface for reading in or outputting data, which are embedded into a communication protocol. The processing unit may be a signal processor, a microcontroller or the like, for example, it being possible for the memory unit to be a Flash memory, an EPROM or a magnetic memory unit. The communication interface may be designed to read in or output data wirelessly and/or in a wire-bound manner, a communication interface which is able to read in or output wire-bound data being able to read these data in, for example electrically or optically, from a corresponding data transmission line or output these into a corresponding data transmission line.

A device may presently be understood to mean an electrical device which processes sensor signals and outputs control and/or data signals as a function thereof. The device may include an interface which may be designed as hardware and/or software. In the case of a hardware design, the interfaces may, for example, be part of a so-called system ASIC which includes a wide variety of functions of the device. However, it is also possible for the interfaces to be separate integrated circuits, or to be at least partially made up of discrete elements. In the case of a software design, the interfaces may be software modules which are present on a microcontroller, for example, in addition to other software modules.

In addition, a computer program product or computer program is advantageous, having program code which may be stored on a machine-readable carrier or memory medium such as a semiconductor memory, a hard disk memory or an optical memory, and which is used to carry out, implement and/or activate the steps of the method according to one of the specific embodiments described above, in particular if the program product or program is executed on a computer or a device.

Exemplary embodiments of the present invention are shown in the figures and are described in greater detail below.

DETAILED DESCRIPTION OF EXAMPLE EMBODIMENTS

Figure 1:
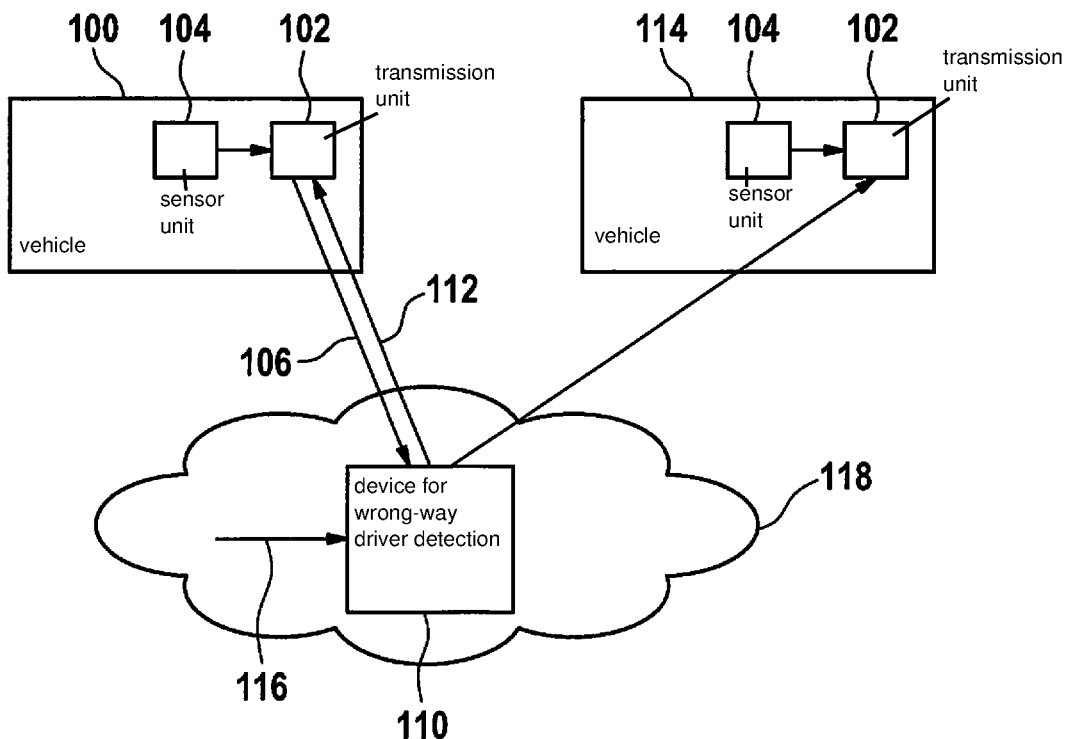
FIG. 1 shows a system for wrong-way driver detection according to one exemplary embodiment.

In the description below of favorable exemplary embodiments of the present invention, identical or similar reference numerals are used for similarly acting elements shown in the different figures, and a repeated description of these elements is dispensed with.

FIG. 1 shows a system for wrong-way driver detection according to one exemplary embodiment. The system includes a vehicle 100, which includes a transmission unit 102 designed to wirelessly emit measuring data 106, collected using at least one sensor unit 104 situated in vehicle 100, to a device 110 for wrong-way driver detection. Device 110 is designed to edit measuring data 106 into edited data and to further process the edited data, using a particle filter, to generate and emit a wrong-way driving signal 112. According to one exemplary embodiment, wrong-way driving signal 112 indicates that vehicle 100 whose measuring data 106 were processed is presently driving the wrong way. According to this exemplary embodiment, both transmission unit 102 of vehicle 100 and a transmission unit 102 of a further vehicle 114 are designed to receive wrong-way driving signal 112 and, in response to a reception of wrong-way driving signal 112, to activate a warning unit of the respective vehicle 100, 114 which, for example, warns a driver of the respective vehicle 100, 114 about the wrong-way drive or, according to one exemplary embodiment, intervenes in an at least semi-automatic control, for example of a braking system or steering system, of the respective vehicle 100, 114. According to different exemplary embodiments, transmission unit 102 may only be designed as a transmitter or as a transceiver unit.

According to one exemplary embodiment, measuring data 106 include position data which were detected using a position determination unit of vehicle 100 and map an instantaneous position of vehicle 100. According to one further exemplary embodiment, measuring data 106 furthermore include movement data, which were detected, for example, using at least one acceleration sensor of vehicle 100 and include pieces of information concerning an instantaneous movement of vehicle 100, for example pieces of information concerning a driving direction, a longitudinal acceleration, a transverse acceleration, or concerning a rotation of the vehicle about a vehicle axis.

According to one exemplary embodiment, device 110 is designed to read in map data 116 which map a road network negotiable by vehicle 100. According to one exemplary embodiment, map data 116 include, for example, pieces of information about road segments of the road network. According to one exemplary embodiment, map data 116, with respect to each road segment, furthermore include at least one parameter which, for example, defines a driving direction specification for the respective road segment or a course of the respective road segment. For example, it may be defined via the parameter whether the road segment extends linearly or follows a curve. According to one specific embodiment, device 110 includes a memory unit in which map data 116 are stored.

According to one exemplary embodiment, device 110 is, or functional blocks of device 110 are, situated or implemented in a cloud 118.

According to one exemplary embodiment, device 110 is designed to determine wrong-way driving signal 112 using a plausible road element. A plausible road element may be understood to mean a road element encompassed by the map data, also referred to as a road segment, for which it is assumed that vehicle 100 is situated thereon. In this case, device 110 is designed to determine the plausible road element using a particle filter. The particles processed by the particle filter are determined by device 110 using the position data transmitted via measuring signal 106 and/or existing particles.

The described approach may be used additionally or alternatively to a variety of methods for detecting a wrong-way driver in which, e.g., a video sensor system is used to detect the passing of a "do not enter" sign or the use of a digital map in conjunction with a navigation is utilized to identify a detection of a wrong driving direction on a road segment which is only negotiable in one direction. Furthermore, the approach may be combined with wireless methods, which detect wrong-way drivers with the aid of infrastructure, such as markers in the roadway or on the roadside.

In addition to detecting a wrong-way driver, the described approach offers many options for responding to a wrong-way driver. Examples include the warning of the wrong-way driver directly via a display or acoustic instructions. It is also possible to use methods by which other drivers in the vicinity of a wrong-way driver are warned, e.g., via vehicle-to-vehicle communication or with the aid of mobile communication. Furthermore, it is possible to warn other road users via variable message signs mounted along the roadside. It is also possible for an intervention in the engine control unit or brake of the vehicle 100 driving the wrong way to take place.

The described approach makes it possible to detect a wrong-way driver and to warn other road users in his or her vicinity in a timely manner, for which only very little time is available.

The described approach applies to a wrong-way driver detection with a client-server solution. A client shall be understood to mean a device, situated on or in a motor vehicle, which has an Internet connection and at least access to position coordinates. For example, it may be transmission unit 102. Transmission unit 102 may be a smart phone, for example. Sensor unit 104 may be integrated into transmission unit 102. In this way, wrong-way driver-specific server-client communication may be implemented with a smart phone as an exemplary client. The smart phone may be connected via a mobile communication network with the aid of a gateway (PDN_GW) to the Internet, in which device 110 may be situated, for example in the form of a server.

From the possible functionalities of a wrong-way driver warning using a client-server solution, the following key problem areas arise for this technology, which are addressed by the approach described here:

a) False Positive Reduction

False positives, i.e., misdetections in the case of correct driving, must be reduced as much as possible, or completely avoided, in the case of a driver warning and/or an active intervention. Depending on the warning concept, the standards up to ASIL A must be met.

b) Time-Critical Execution of the Trigger Chain

To keep the risk for other road users originating from a wrong-way driver as low as possible, an intervention and/or warning should take place as quickly as possible. This means, the entire functional chain from the detection of a critical situation, through the detection of a wrong-way driver, to the intervention or warning should be run through in a preferably short time period. The utilization and thus the necessary performance capability of the server, for example of device 110, during a comprehensive use of this function plays a very important role. In addition to the trigger time, the economic efficiency also represents an important sub-aspect.

c) Communication, Data Efficiency and Power Consumption

The communication and the power consumption must be as efficient and as low as possible, especially for mobile devices, to achieve an acceptable rechargeable battery operating time. The overloading of a mobile communication cell or other wireless communication unit also has to be suppressed by a data-efficient communication. In addition, the data volume and the associated costs have to be limited to the extent possible. The efficiency of the communication is also an extremely important factor on the server side for reasons of processing performance.

The described approach covers especially the key areas a) "false positive reduction" and b) "time-critical execution of the trigger chain", but c) "communication, data efficiency and power consumption" is also possibly influenced. The detection of wrong-way drivers in cloud 118, based on commercially available smart phone and connectivity control unit sensor systems, is no trivial undertaking.

Figure 2:
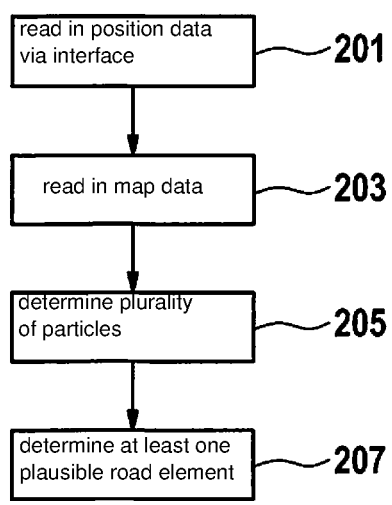
FIG. 2 shows a flow chart of a method for wrong-way driver detection according to one exemplary embodiment.

FIG. 2 shows a flow chart of a method for wrong-way driver detection according to one exemplary embodiment. For example, the method may be carried out using units of the device shown in FIG. 1 for wrong-way driver detection.

The method includes a step 201 in which position data are read in via an interface. The position data represent a measured position of a vehicle. In a step 203, map data are read in which map a set of road elements of the road network negotiable by a vehicle. In a step 205, a plurality of particles is determined, using the position data. Each of the particles represents an assumed position of the vehicle and a weighting assigned to the assumed position. According to one exemplary embodiment, the assumed positions are distributed around the measured position. In a step 207, at least one road element which is plausible with respect to a negotiation by the vehicle is determined from the set of road elements based on the plurality of particles. At least step 207 is carried out using a particle filter. For example, a road element may be determined as a plausible road element as a function of a local distribution of the particles or the weightings of the particles. For this purpose, it may be checked, for example, whether a predetermined set of particles is situated on the road element or particles having a predetermined weighting are situated on the road element.

In step 207, road elements which meet a predetermined criterion may be excluded in the determination of the plausible road element. According to one exemplary embodiment, these are road elements, for example, which are situated more closely together than by a predefined reference distance or road elements which are situated in a junction area of an expressway. For example, the junction area may identify an area in which an on-ramp and an exit ramp of an expressway open into a further road, for example a rural road. The junction area may have a predetermined length, for example, which is measured proceeding from the further road. In addition or as an alternative, the length of the junction area may be selected to be as long as the on-ramp and the exit ramp extend at least approximately in parallel. Step 207 may thus include a step in which it is checked whether two road elements opening into a further road extend at least approximately in parallel to one another. If this is the case, these road elements may be excluded in the determination of the plausible road element.

According to one exemplary embodiment, in a further step a wrong-way driving signal is provided when an instantaneous driving direction of the vehicle does not agree with a driving direction specification of the plausible road segment.

It is not crucial for the wrong-way driver detection to know which route the wrong-way driver traveled. The information which is required is mainly where the wrong-way driver is presently situated, and whether he or she is traveling a road counter to the driving direction. For this ascertainment, the history is required, of course, which, however, is not part of the problem, but rather the path to the result.

Based on these circumstances, a method based on a particle filter is introduced. Similarly to the Kalman filter, the particle filter may be used for systems which are subject to a hidden Markov chain characteristic, i.e., a Markov chain with unobserved states.

Figure 3:
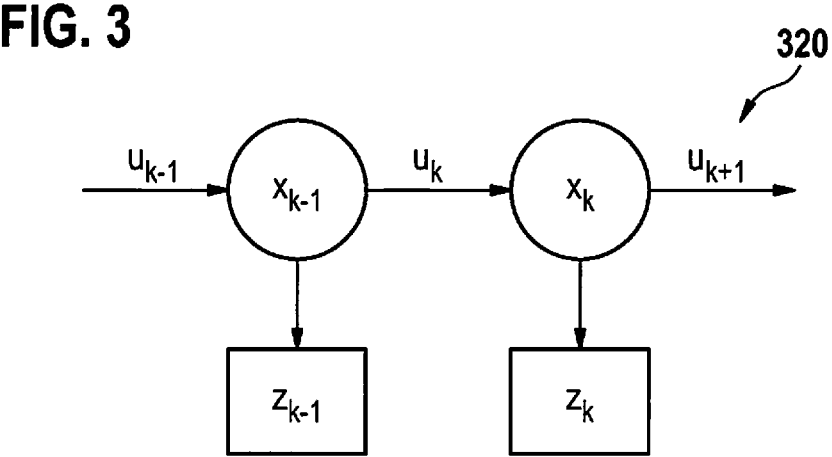
FIG. 3 shows a hidden Markov chain model.

FIG. 3 shows a hidden Markov chain model 320 including state x and observation z at times k and k−1.

This means, the state of a system cannot be measured directly, but may be estimated based on other observations. In this case, the position and thus the instantaneous road must be estimated. For this purpose, the following equation must be solved:

$$p(x_k \mid z_{0:k}, u_{0:k}) = \eta \cdot g(z_k \mid x_k, z_{0:k-1}, u_{0:k}) \pi(x_k \mid z_{0:k-1}, u_{0:k})$$

The state at point in time k is described hereafter with $x_k$, and the previous states are summarized with $x_{0:k-1} = (x_0, \ldots, x_{k-1})$. Analogously to x, this convention also applies to control variables u and observations u. $\eta$ describes a normalization term, which hereafter, however, is not of great importance. This equation may be simplified to the following equation:

$$p(x_k \mid z_{0:k}, u_{0:k}) = \eta \cdot g(z_k \mid x_k) \int_{x_k} f(x_k \mid x_{k-1}, u_k) p(x_{k-1} \mid z_{0:k}, u_{0:k}) dx_{k-1}$$

And this is described in two steps: the prediction step $$\pi(x_k \mid z_{0:k-1}, u_{0:k}) = \int_{x_{k-1}} \underbrace{f(x_k \mid x_{k-1}, u_k)}_{motion} p(x_{k-1} \mid z_{0:k-1}, u_{0:k}) dx_{k-1}$$

and the weighting term:

$$p(x_k \mid z_{0:k}, u_{0:k}) = \eta \cdot \underbrace{g(z_k \mid x_k, u_k)}_{observations} \pi(x_k \mid z_{0:k-1}, u_{0:k}),$$

In the case of a particle filter, the integral is solved via the probability distributions using a numerical approximation $$\pi(x) = \sum_{j=1}^{J} w^{[j]} \delta(x - x^{[j]})$$

and Monte Carlo methods. $w^{[j]}$ describes the weight/the probability of each jth particle. A set of particles is described with $$x = \{\langle x^{[j]}, w^{[j]} \rangle\}_{j=1,\ldots,J}.$$

In this way, each particle has the weight $w^{[j]}$ and the state $x^{[j]}$.

Figure 4:
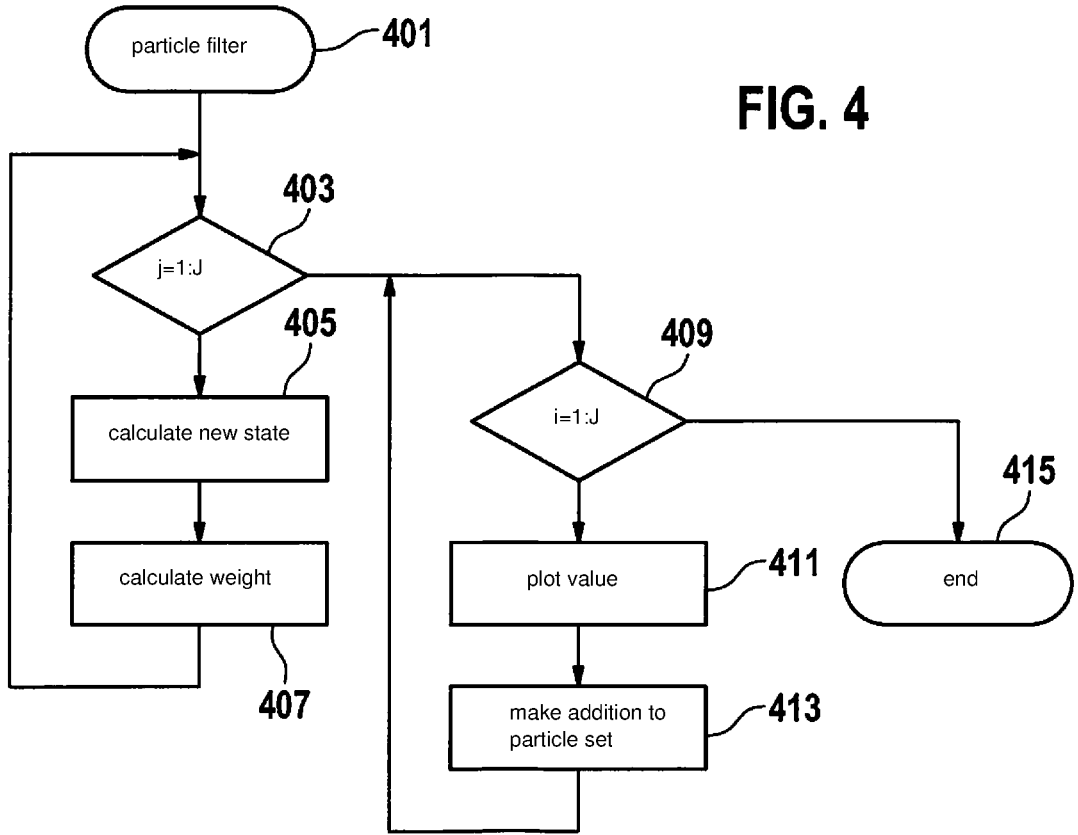
FIG. 4 shows a sequence of a particle filter process according to one exemplary embodiment.

FIG. 4 shows the sequence of a particle filter process according to one exemplary embodiment. For this purpose, FIG. 4 shows a hidden Markov chain model having state x and observation z at times k and k−1.

A large portion of the work is to find a suitable function for $$\underbrace{f(x_k \mid x_{k-1}, u_k)}_{motion} \text{ and } \underbrace{g(z_k \mid x_k, u_k)}_{observations}$$

which optimally display the problem. For this, it is essential to define states x to be estimated.

Block 401 denotes the particle filter ($X_{k-1}$, $u_k$, z).

From block 403, jumps are made to block 405 until all values j=1:J have been run through.

In block 405, a new state is calculated:

$$x_k^{[j]} = f(x_k \mid x_{k-1}^{[j]}, u_k)$$

In block 407, the weight is calculated:

$$w_k^{[j]} = g(z_k, m_j \mid x_k, u_k)$$

When all values have been run through in block 403, a jump to block 409 occurs. From block 409, jumps are made to block 411 until all values i=1:J have been run through.

In block 411, a value according to $w_k^{[i]}$ is plotted.

In block 413, an addition is made to the particle set according to $x_k^{[i]} \rightarrow X_k$.

When all values have been run through in block 409, a jump to block 415 occurs, which represents the end $X_k$.

Figure 5:
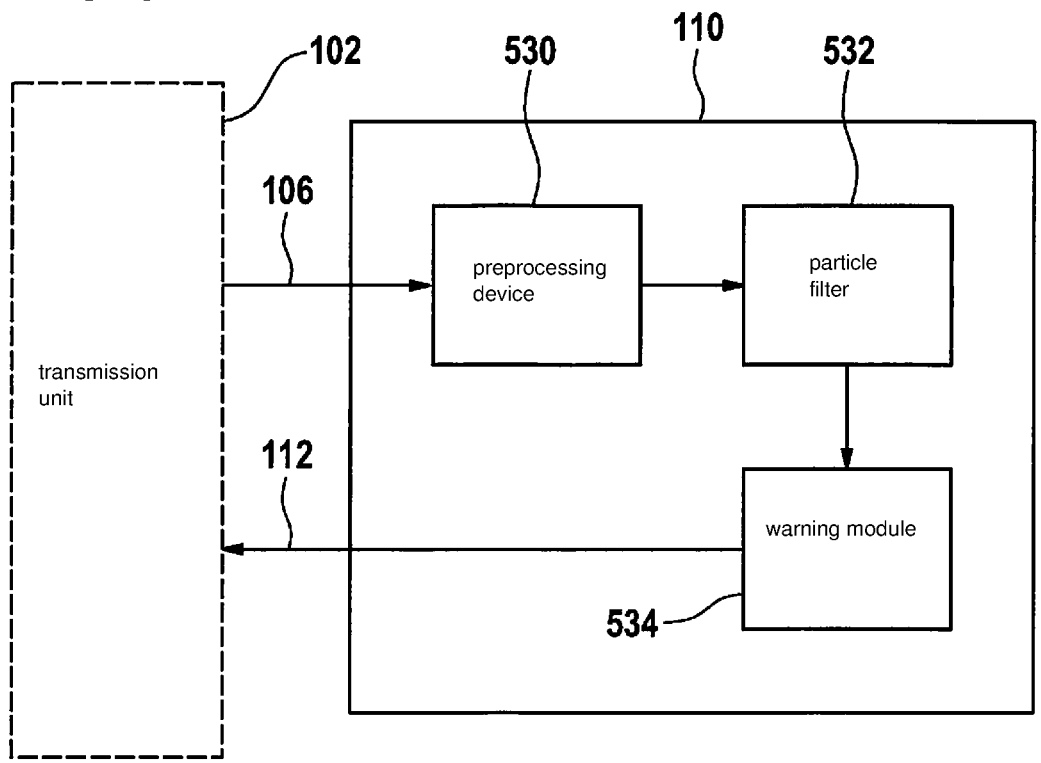
FIG. 5 shows a system for wrong-way driver detection according to one exemplary embodiment.

FIG. 5 shows a system for wrong-way driver detection according to one exemplary embodiment. The system includes units 102, for example in the form of the transmission units described based on FIG. 1, and a device 110 for wrong-way driver detection, which according to this exemplary embodiment is designed as a so-called WDW server. Device 110 is designed to receive data 106, for example measuring data described based on FIG. 1, from unit 102, and to provide a warning 112 based on data 106 and send them back to units 102, for example in the form of the wrong-way driving signal described based on FIG. 1.

The device includes a unit 530 for preprocessing, a particle filter 532 and a warning module 534.

Particle filter 532 is embedded in a simplified architecture of a cloud-based wrong-way driver warning as shown in FIG. 5.

Using particle filter 532, it is possible to approximately determine the probability distribution of the position of the car.

Figure 6:
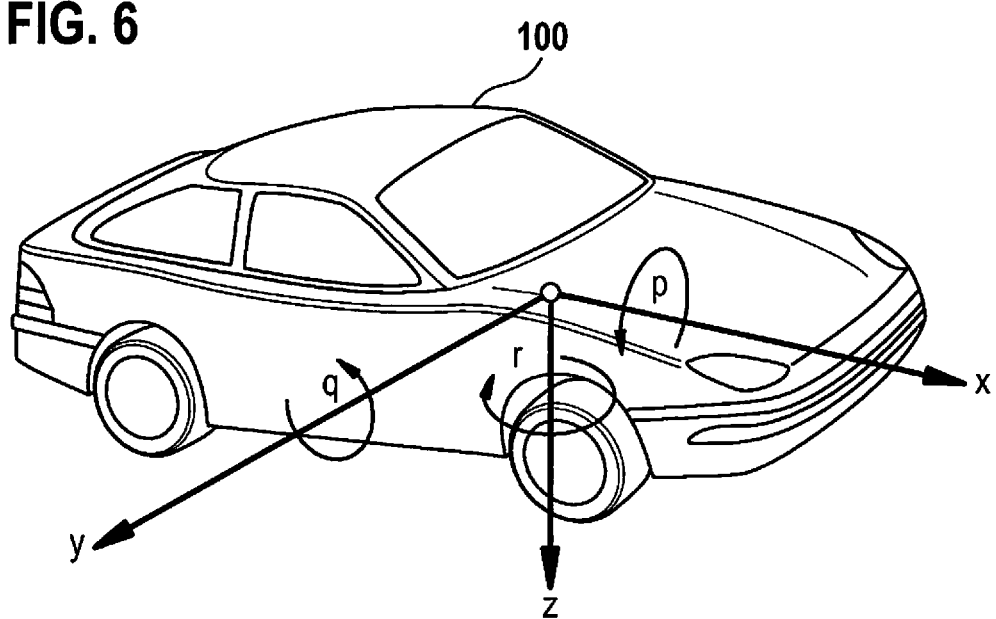
FIG. 6 shows a vehicle according to one exemplary embodiment.

Based on a vehicle 100, FIG. 6 shows values which may be incorporated into the model shown based on FIG. 5. The values may, for example, be states in the direction of longitudinal axis x, transverse axis y, vertical axis z and a rolling p about the longitudinal axis, a pitching q about the transverse axis, and a yawing r about the vertical axis.

With respect to a map matching using the particle filter, for the Bayes filter $p(x_k \mid z_{0:k}, u_{0:k})$ applies. With reference to FIG. 3, $x_k$ may denote what the state (not measured) is, for example the geographical longitude, latitude and altitude, $u_{k+1}$ may denote how vehicle 100 is moving, for example with respect to the speed and rotation rates, and $z_k$ may denote what may be observed, for example a GPS signal or a signal regarding the surroundings of vehicle 100 (camera, etc.).

Figure 7:
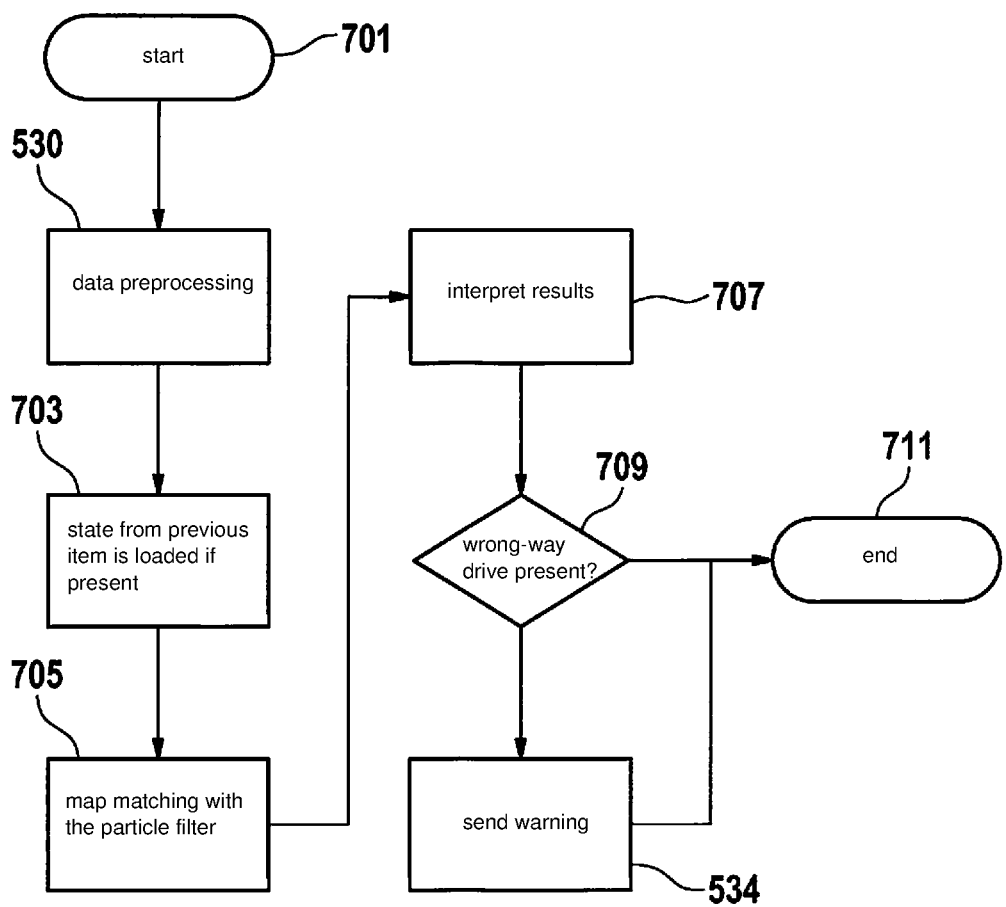
FIG. 7 shows a program sequence according to one exemplary embodiment.

FIG. 7 shows a program sequence according to one exemplary embodiment. The sequence starts with a block 701. In a block 530, a data preprocessing is carried out, as is described based on FIG. 5, for example. In a block 703, if present, the state from the previous item is loaded. In a block 705, a map matching with the particle filter takes place. In a block 707, an interpretation of the results takes place. In a block 709, it is checked whether a wrong-way drive is present. If this is the case, a warning is sent in a block 534, as is described based on FIG. 5, for example. If no wrong-way drive is present, the end of the program sequence takes place with a block 711.

Figure 8:
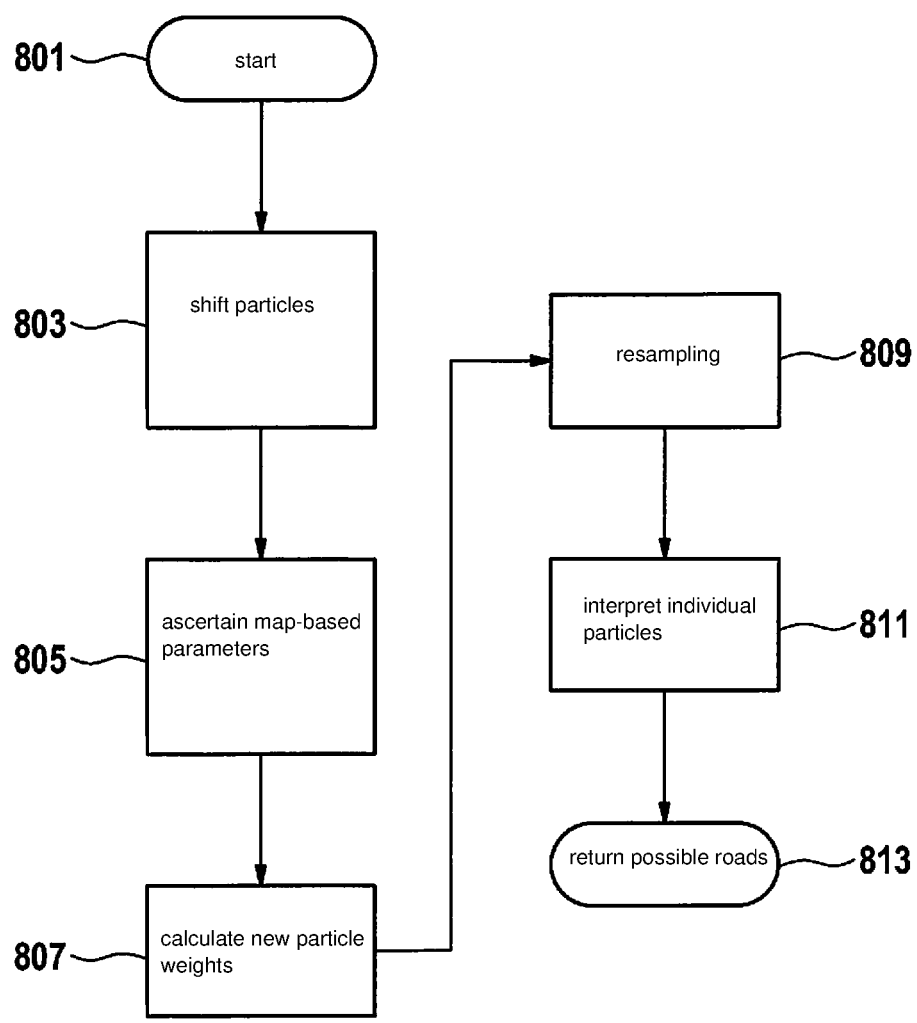
FIG. 8 shows a program sequence of a particle filter according to one exemplary embodiment.

FIG. 8 shows a program sequence of a particle filter according to one exemplary embodiment. A block 801 denotes a start of the particle filter. In a block 803, a shifting of the particles takes place, taking the sensor inaccuracy into consideration, for example of the sensor unit described based on FIG. 1. In a block 805, an ascertainment of the map-based parameters takes place. Such a parameter indicates, for example, whether a particle is situated on a road or what the name thereof is. In a block 807, a calculation of the new particle weights takes place. In a block 809, a so-called resampling takes place, in which the irrelevant areas and/or particles are eliminated. In a block 811, an interpretation of the individual particles takes place, and in a block 813, a return of the possible roads takes place.

By using the particle filter, the aspects described below are improved. On the one hand, a sequentially (possible in real time) operating method is created, which primarily ascertains the instantaneous position on the road network. Furthermore, a robust estimation of the instantaneous position on the road network is possible. An uncertainty is ascertainable via the instantaneous estimation. This makes it possible to be able to reliably delay the decision about a potential wrong-way drive, to a useful degree.

Figure 9:
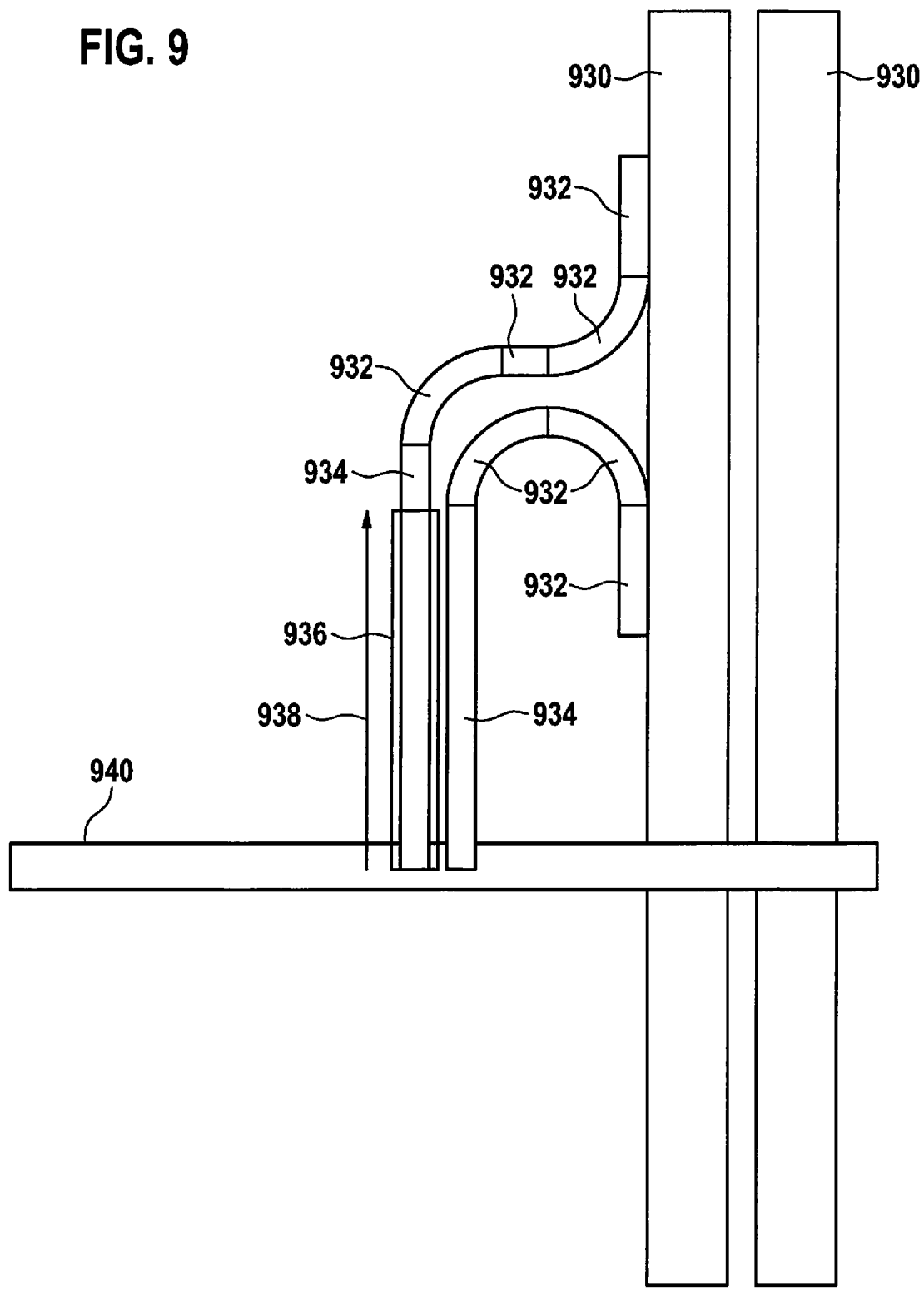
FIG. 9 shows road elements according to one exemplary embodiment.

FIG. 9 shows a representation of road elements 930, 932, 934 according to one exemplary embodiment. Road elements 930, 932, 934 are part of a road network negotiable by a vehicle, for example the vehicle described based on FIG. 1. Two road elements 930 represent an expressway, road element 930 shown on the left representing one or multiple lanes for a first driving direction, and road element 930 shown on the right representing one or multiple lanes for an opposite second driving direction. Road elements 932, 934 represent segments of an on-ramp and an exit ramp for the expressway represented by road elements 930. Two road elements 934 are situated in a junction area 936, which is defined by a predefined length 938, for example a length x in meters. Predefined length 938 is used proceeding from a start of the on-ramp or an end of the exit ramp, which are usually situated closely together. In a junction area 936, road elements 934 extend closely next to one another, so that it is very difficult here to identify which of road elements 934 a vehicle is actually situated on. It is therefore useful to exclude junction area 936 in the determination of a plausible road element.

It is not crucial for the wrong-way driver detection to know which route the wrong-way driver traveled. The information which is required is mainly where the wrong-way driver is presently situated, and whether he or she is traveling a road counter to the driving direction. For this ascertainment, the history is required, of course, which, however, is not part of the problem, but rather the path to the result.

In the starting area of an on-ramp, for example junction area 936 to a rural road 940, it is not possible to reliably detect the wrong-way driver using a customary sensor system (car, smart phone, . . . ).

According to one exemplary embodiment, the first meters 938 of the on-ramp are thus excluded. There are two approaches for this.

FIG. 9 shows a first approach in which the first x meters 938 of an expressway on-ramp in the opposite driving direction are excluded.

As is shown in FIG. 9, especially on-ramps and exit ramps 932, 934 of expressways 930 situated closely together, which abut a rural road 940, federal highway etc., cause big problems. For this reason, these areas are excluded from the solution set of possible roads 930, 932, 934 on which a vehicle is presently situated. Value x 938 may be depicted by establishing a constant or analyzing the two road segments 934 which are at least approximately in parallel here, and by excluding area 936 in which both extend at least almost in parallel.

Figure 10:
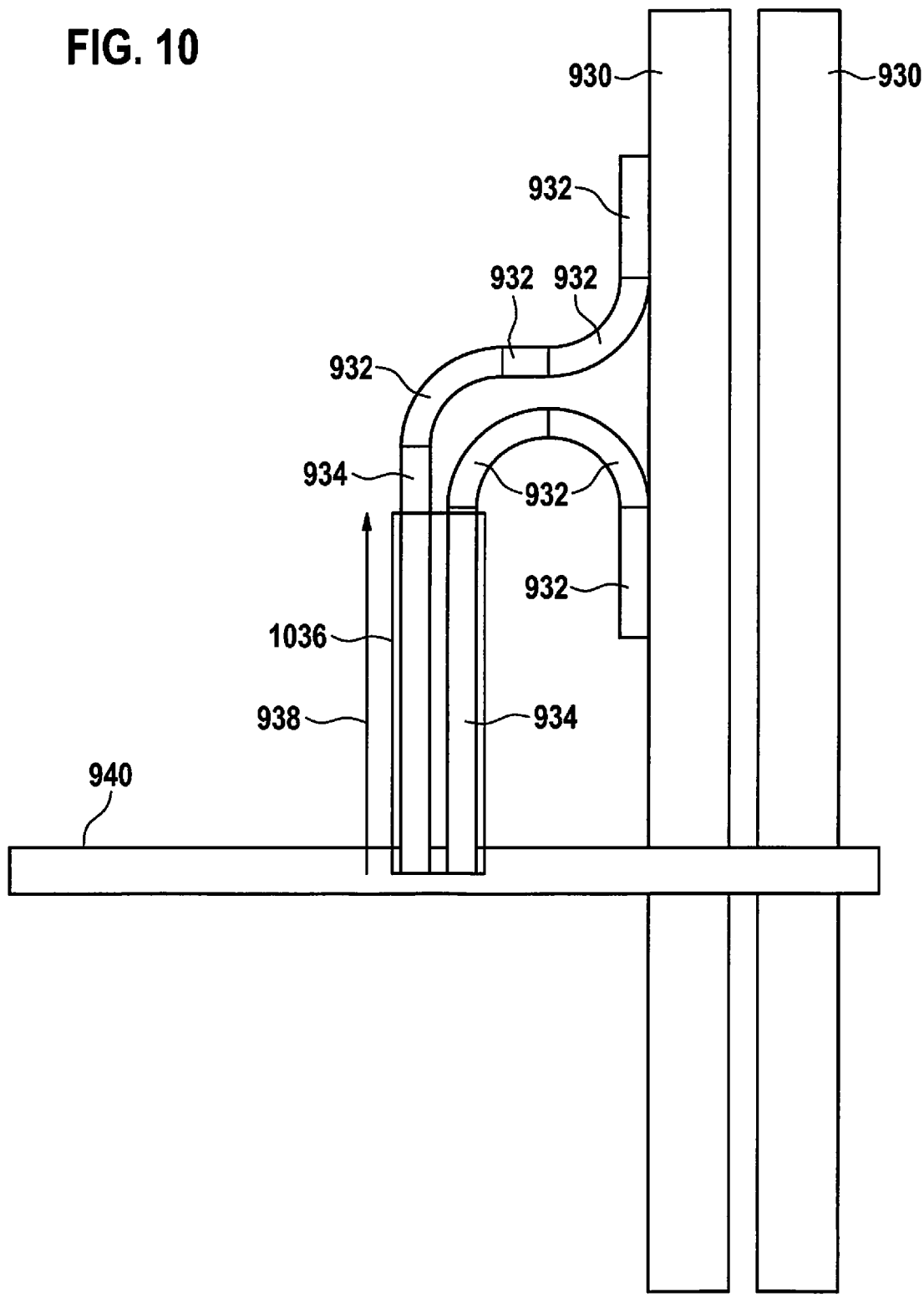
FIG. 10 shows road elements according to one exemplary embodiment.

FIG. 10 shows a representation of road elements 930, 932, 934 according to one exemplary embodiment. These may be road elements 930, 932, 934 described based on FIG. 9.

Proceeding from further road 940, two road elements 934 at least initially extend at least approximately in parallel to one another. Typically, two road elements 934 extend in parallel to one another over a length 938, for example a length x in meters, which corresponds to a length of the shorter of two road elements 934. According to this exemplary embodiment, length 938 is used for the definition of a combined road element 1036.

FIG. 10 shows an exemplary embodiment in which the first meters 938 of the on-ramp are excluded according to a second approach. According to this approach, the first x meters 938 of an expressway on-ramp are combined. Alternatively, the same effect is caused by combining individual road segments 934 in the parallel area, as is shown in FIG. 10. Here, two road elements 934 representing the on-ramp and exit ramp are combined by road element 1036, which is thus permitted to be negotiated in both driving directions.

If one exemplary embodiment includes an "and/or" linkage between a first feature and a second feature, this should be read in such a way that the exemplary embodiment according to one specific embodiment includes both the first feature and the second feature, and according to an additional specific embodiment includes either only the first feature or only the second feature.

What is claimed is:

1. A method for wrong-way driver detection, the method comprising:
   reading in position data via an interface, the position data representing a measured position of a vehicle;
   reading in map data, which map a set of road elements of a road network negotiable by the vehicle;
   determining a plurality of particles using the position data, each of the particles representing an assumed position of the vehicle and a weighting assigned to the assumed position, wherein the assumed positions of the vehicle include positions distributed around the measured position of the vehicle; and
   determining at least one road element from the set of road elements which is plausible with respect to a negotiation by the vehicle based on the plurality of particles, using a particle filter.

2. The method as recited in claim 1, further comprising:
   providing a wrong-way driving signal using the at least one plausible road element, the wrong-way driving signal indicating whether or not a wrong-way drive of the vehicle is present.

3. The method as recited in claim 1, wherein in the step of determining the plausible road element, road elements from the set of road elements which are situated more closely than a predefined reference distance from one another are excluded from the determination of the at least one plausible road element.

4. The method as recited in claim 1, wherein, in the step of determining the plausible road element, road elements from the set of road elements which are situated more closely than a predefined reference distance from one another are used as a combined road element in the determination of the at least one plausible road element.

5. The method as recited in claim 1, wherein, in the step of determining the plausible road element, road elements from the set of road elements situated in a junction area of a road are excluded from the determination of the at least one plausible road element.

6. The method as recited in claim 1, wherein, in the step of determining the plausible road element, road elements from the set of road elements which are situated at a distance of less than 10 meters next to one another are excluded from the determination of the at least one plausible road element.

7. The method as recited in claim 1, wherein, in the step of reading in the map data, the map data are read in via an interface of a processor cloud.

8. A device for wrong-way driver detection, the device configured to, in corresponding units:
read in position data via an interface, the position data representing a measured position of a vehicle;
read in map data, which map a set of road elements of a road network negotiable by the vehicle;
determine a plurality of particles using the position data, each of the particles representing an assumed position of the vehicle and a weighting assigned to the assumed position, wherein the assumed positions of the vehicle include positions distributed around the measured position of the vehicle; and
determine at least one road element from the set of road elements which is plausible with respect to a negotiation by the vehicle based on the plurality of particles, using a particle filter.

9. A system for wrong-way driver detection, the system comprising:
at least one transmitter, which is situatable or situated in a vehicle and configured to emit position data, the position data representing a measured position of the vehicle; and
a device for wrong-way driver detection, which is configured to receive the position data emitted by the at least one transmitter, the device configured to:
read in the position data via an interface,
read in map data, which map a set of road elements of a road network negotiable by the vehicle,
determine a plurality of particles using the position data, each of the particles representing an assumed position of the vehicle and a weighting assigned to the assumed position, wherein the assumed positions of the vehicle include positions distributed around the measured position of the vehicle, and
determine at least one road element from the set of road elements which is plausible with respect to a negotiation by the vehicle based on the plurality of particles, using a particle filter.

10. A non-transitory machine-readable memory medium on which is stored a computer program for wrong-way driver detection, the computer program, when executed by a computer, causing the computer to perform:
reading in position data via an interface, the position data representing a measured position of a vehicle;
reading in map data, which map a set of road elements of a road network negotiable by the vehicle;
determining a plurality of particles using the position data, each of the particles representing an assumed position of the vehicle and a weighting assigned to the assumed position, wherein the assumed positions of the vehicle include positions distributed around the measured position of the vehicle; and
determining at least one road element from the set of road elements which is plausible with respect to a negotiation by the vehicle based on the plurality of particles, using a particle filter.

11. The method as recited in claim 1, wherein in the step of determining the plausible road element, a road element from the set of road elements on which a predetermined set of the particles is situated is determined to be a plausible road element.

12. The method as recited in claim 1, wherein in the step of determining the plausible road element, a road element from the set of road elements on which a predetermined set of the particles having a predetermined weighting is situated is determined to be a plausible road element.

13. The device as recited in claim 8, wherein the device is further configured to provide a wrong-way driving signal using the at least one plausible road element, the wrong-way driving signal indicating whether or not a wrong-way drive of the vehicle is present.

14. The system as recited in claim 9, wherein the device is further configured to provide a wrong-way driving signal using the at least one plausible road element, the wrong-way driving signal indicating whether or not a wrong-way drive of the vehicle is present.

15. A method for wrong-way driver detection, the method comprising:
reading in position data via an interface, the position data representing a measured position of a vehicle;
reading in map data, which map a set of road elements of a road network negotiable by the vehicle;
determining a plurality of particles using the position data, each of the particles representing an assumed position of the vehicle and a weighting assigned to the assumed position, wherein the assumed positions of the vehicle include positions distributed around the measured position of the vehicle;
determining at least one road element from the set of road elements which is plausible with respect to a negotiation by the vehicle based on the plurality of particles, using a particle filter; and
providing a wrong-way driving signal using the at least one plausible road element, the wrong-way driving signal indicating whether or not a wrong-way drive of the vehicle is present;
wherein:
in the step of determining the plausible road element, road elements from the set of road elements which are situated more closely than a predefined reference distance from one another are excluded from the determination of the at least one plausible road element, and/or
in the step of determining the plausible road element, road elements from the set of road elements which are situated more closely than a second predefined reference distance from one another are used as a combined road element in the determination of the at least one plausible road element, and/or in the step of determining the plausible road element, road elements from the set of road elements situated in a junction area of a road are excluded from the determination of the at least one plausible road element, and/or in the step of determining the plausible road element, road elements from the set of road elements which are situated at a distance of less than 10 meters next to one another are excluded from the determination of the at least one plausible road element.

16. The method as recited in claim 15, wherein in the step of determining the plausible road element, the road elements from the set of road elements which are situated more closely than the predefined reference distance from one another are excluded from the determination of the at least one plausible road element.

17. The method as recited in claim 15, wherein, in the step of determining the plausible road element, the road elements from the set of road elements which are situated more closely than the second predefined reference distance from one another are used as a combined road element in the determination of the at least one plausible road element.

18. The method as recited in claim 15, wherein, in the step of determining the plausible road element, the road elements from the set of road elements situated in a junction area of a road are excluded from the determination of the at least one plausible road element.

19. The method as recited in claim 15, wherein, in the step of determining the plausible road element, the road elements from the set of road elements which are situated at a distance of less than 10 meters next to one another are excluded from the determination of the at least one plausible road element.

* * * * *